United States Patent

[11] 3,602,254

[72] Inventor Donald G. Fawkes
Aurora, Ill.
[21] Appl. No. 7,195
[22] Filed Jan. 30, 1970
[45] Patented Aug. 31, 1971
[73] Assignee Henry Pratt Company

[54] VALVE POSITION INDICATING SYSTEM
12 Claims, 4 Drawing Figs.
[52] U.S. Cl. .................................................. 137/554,
340/196
[51] Int. Cl. ............................................. F16k 37/00,
G08c 19/12
[50] Field of Search ........................................... 137/554;
251/304, 305; 340/196

[56] References Cited
UNITED STATES PATENTS
3,148,325 9/1964 Burk .............................. 340/196 UX
3,221,246 11/1965 Sanborn ........................ 340/196 UX
3,355,728 11/1967 Smith ............................ 137/554 X
3,500,365 3/1970 Cain ............................. 340/196

Primary Examiner—Henry T. Klinksiek
Attorney—Hofgren, Wegner, Allen, Stellman & McCord ABSTRACT: A valve position indicator particularly suited for use with valves having a first shaft driven by an operator and a second stub shaft for journaling the valve member. A piece of magnetically conductive material is imbedded in an end of the stub shaft which protrudes from the valve casing and which is received in a housing formed in part of magnetically conductive material. Within the housing is a pair of magnetic pole pieces each having an electrical winding associated therewith. One of the windings is connected to AC power while the other may be connected to a meter so that, dependent upon the position of the magnetically conductive material imbedded in the stub shaft and thus the position of the valve, a greater or a lesser amount of current will be induced in the second winding with the amount of current induced in the second winding being indicative of the valve position.

PATENTED AUG 31 1971   3,602,254
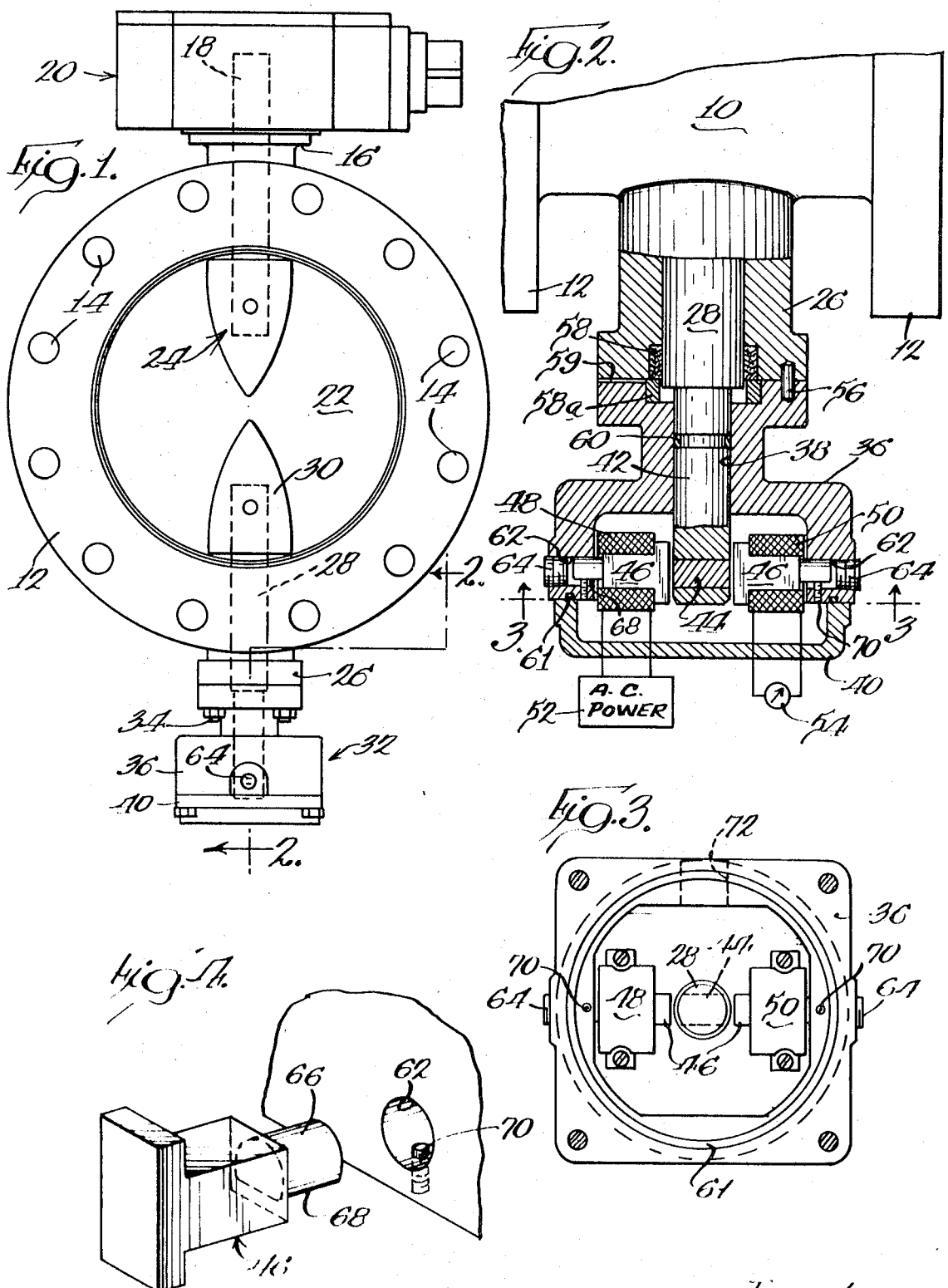
Inventor:
Donald G. Fawkes
By Hofgren, Wegner,
Allen, Stellman & McCord
Attys

VALVE POSITION INDICATING SYSTEM

BACKGROUND OF THE INVENTION

This invention relates to valve position indicators for valves of various sizes utilized in water distribution or fire protection systems or the like such as butterfly valves, ball valves, plug valves, cone valves or any other type of valve having a shaft which rotates through about 90° when the valve is moved from its fully open position to its fully closed position or vice versa.

For many years, there has existed a problem in conjunction with the use of such valves insofar as it has been difficult to ascertain the particular position of a valve member within the valve casing without actually inspecting the valve itself. Furthermore, even inspection of the actual valve can be deceptive. For example, where a valve has a manual actuator for driving the valve control shaft, should the valve drive shaft shear, a not unheard of occurrence, one inspecting the position of the manual operator as an indication of actual valve position would be misled as there would no longer be a driving connection between the operator and the valve member.

Remote indication of valve position can be obtained when motor driven operators for the valve are used and which can precisely control the movement of a valve member to any of an infinite variety of positions from a fully open position to a fully closed position. When such systems are used, the nulling of an associated servo system can be taken as an indication that the valve has assumed its commanded position. However, should the valve drive shaft shear, the system could null without the valve moving to its commanded position to provide an inaccurate indication.

Therefore, in order to provide a more positive indication of the position of a valve member within a valve casing and one which can be monitored from a location remote from the valve, it has been proposed that an electrical winding be placed around the valve casing and an electrical winding be imbedded in the valve member. As a result, a transformer is formed and the amount of inductance from one winding to the other can be measured and taken as an indication of the position of the valve member within the valve casing. For example, in such a system, maximum inductance would be obtained when the valve is fully closed while minimum inductance would be obtained when the valve is fully open.

While such a system completely overcomes the problem of providing a positive indication of the valve position when the valve drive shears, one difficulty encountered with such a construction comes from the practical consideration that a minimum reading on a meter or the like would be obtained when the valve was fully open. And in practice, the reading is so minimal as to be difficult to quickly distinguish the reading from that which would be obtained if there were an electrical failure in the system or an outside power failure. Further, because one winding is actually imbedded in the valve member itself, and the valve member is movable, it then becomes necessary to provide an electrical takeoff system so that the amount of current induced on the winding imbedded in the valve member can be measured. Generally, this has required costly machining of one of the valve shafts to provide a bore therein through which electrical conductors may pass to the exterior of the valve.

Another problem with such systems is the exacting care required in placing the winding on the valve member. As mentioned previously, such valve members are customarily quite large in size and are subjected to much stress in use. As a result, the winding may be easily damaged. Furthermore, because the valve member is immersed in a liquid, there is presented a problem of sealing the electrical winding from the liquid to prevent shorting of the same.

SUMMARY OF THE INVENTION

It is the principal object of the invention to provide a new and improved valve position indicating system; and more particularly, one that will provide a positive indication even in the case of failure of a valve drive system; one which does not require a commutation system; one which is not subject to the stresses normally applied to valves in water distribution systems; and one which does not require that delicate steps be taken to seal the indicating system from any liquid whose flow is controlled by the valve.

The exemplary embodiment of the invention achieves the foregoing objects by taking advantage of the presence of the customary undriven stub shaft in many of the types of valves mentioned previously. Because the same is not driven, it is not at all prone to shearing as is the case with the drive shaft for the valve and accordingly, its position may be taken as an indication of the position of the valve member within the valve casing.

According to the exemplary embodiment of the invention, the stub shaft has an end that extends outwardly from the valve casing, is magnetically nonconductive and has imbedded therein near one end thereof, a piece of magnetically conducting material. The end of the stub shaft is received in a housing which is at least in part formed of a magnetically conducting material and which includes inwardly extending, opposed magnetically conducting pole pieces which are arranged to define a magnetic flux path in conjunction with the magnetically conducting portion of the housing and the piece of magnetically conducting material imbedded in the stub shaft. One of the pole pieces has a primary winding wound thereabout which is to be connected to alternating current power while the other has a secondary winding wound thereabout and which may be connected to a meter.

When the magnetically conducting material within the stub shaft is aligned between the two pole pieces to maximize the area of the flux path, maximum current will be induced in the secondary winding to provide an indication of one valve position. When the valve member is rotated 90° to the other of its extreme positions, the area of the flux path will be at its minimum and a minimal amount of current will be induced in the secondary winding thereby providing an indication that the valve is in the other of its extreme positions. For intermediate positions, the amount of induced current in the secondary winding will vary dependent upon each such position.

Other objects and advantages will become apparent from the following specification taken in conjunction with the accompanying drawings.

DESCRIPTION OF THE DRAWINGS

FIG. 1 is a side elevation of a butterfly valve having a valve operator and embodying a valve position indicating system made according to the invention;

FIG. 2 is an enlarged fragmentary vertical section taken approximately along the line 2—2 of FIG. 1;

FIG. 3 is a horizontal section taken approximately along the line 3—3 of FIG. 2; and FIG. 4 is an exploded view of a pole piece employed in the invention.

DESCRIPTION OF THE PREFERRED EMBODIMENT

With reference to FIGS. 1 and 2, an exemplary embodiment of a valve indicating system is seen to be employed with a butterfly valve having a valve casing, generally designated 10, which terminates in end flanges 12 having apertures 14 therein by which the same may be connected into a liquid-conveying system. Valve casing 10 includes an upper collar 16 through which a shaft 18 having its upper end operatively associated with a manual valve operator drive, generally designated 20, extends although a motor driven operator could be substituted therefor. The lower end of the shaft 18 is affixed to a valve member, generally designated 22, by suitable securing means 24.

The valve casing 10 includes a lower collar 26 in which a second stub shaft 28 is journaled. The stub shaft 28 is also secured to the valve member 22 by any suitable securing means 30. The overall arrangement is such that the two shafts 18 and 28 mount the valve member 22 for rotation about a common axis within the valve casing 10 to control the flow of fluid therethrough.

A valve position sensor, generally designated 32, is attached to the lowermost side of the collar 28 by securing means 34 and, as best seen in FIG. 2, comprises a housing having an upper section 36 formed of a magnetically conducting material such as cast iron with a central opening 38 through which the shaft 28 extends. The housing is completed by a lower section 40 secured to the upper section 36 by any suitable means and which may be formed of any desired material.

The shaft 28 has a reduced diameter end section 42 which is formed of a magnetically nonconducting material such as stainless steel and which includes a piece of magnetically conducting material 44 imbedded therein. The magnetically conducting material 44 is interposed between a pair of opposed soft iron pole pieces 46 which extend inwardly from the upper housing section 36 and together with the pole pieces 46 and the upper housing section 36 define a continuous magnetic flux path.

The pole pieces 46 have about their midsections respective windings 48 and 50. The winding 48 serves as the primary winding of a transformer and is adapted to be connected to any suitable source of pulsating electric current such as an alternating current power source 42. The winding 50 serves as the secondary winding of the transformer and may be connected to a meter 54 which serves as an indicator to indicate the position of the valve.

A locating pin 56 insures that the upper housing section 36 is properly mounted on the valve housing collar 26. Seals 58 held in place by retainer 58a seal against internal fluid pressure in the valve. Should any fluid pass the seals 58, pressure is relieved into the ground through weep passage 59. An O-ring seal 60 on the shaft 42 prevents any pressure or ground water from entering the electrical housing 36. Pressure inside the housing 36 will generally be atmospheric only. A seal 61 is employed between the upper and lower housing sections 36 and 40 to provide a moisture barrier.

Returning now to the pole pieces 46, it will be seen that the upper housing section 36 includes a pair of opposed bores 62 which are closed by plugs 64. As best seen in FIG. 4, each pole piece 46 is generally T-shaped and includes a generally cylindrical base section 66 having a flat 68 on one side thereof. The base 66 is received within the corresponding one of the bores 62 in such a way that a set screw 70 may embrace the flat 68 to hold the pole piece 46 in place with its top generally parallel to the axis of the opening 38. The intimate contact of the base 66 within the bore 62 insures a good flux path and the provision of the set screws 70 permit adjustment of each pole piece 46 relative to the magnetically conducting material 44 imbedded in the shaft 28 so as to attain a desired gap between the pole pieces 46 and the magnetically conducting material 44. Therefore, the path of magnetic flux may be made constant from one valve to the next thereby permitting standardization of monitoring equipment.

The foregoing construction permits the components to be easily fabricated and located within the housing upper section 36. For example, the pole pieces 46 may be individually made to the desired configuration without requiring costly machining operations as would be the case if the pole pieces were integral with the housing section 36. Furthermore, the windings 48 and 50 may be prewound on a mandrel and then easily slipped over the midsection of the T-shaped pole pieces 46 prior to the insertion of the bases of the pole pieces 46 into the apertures 62.

Finally, the upper housing section 36 may be provided with a tapped bore 72 for connection to electrical conduit (not shown) through which electrical wires connected to the windings 48 and 50 may pass. Of course, suitable sealing means, such as a sealing compound, will be employed in conjunction with the bore 72 and the conduit connected thereto to provide a moisture barrier.

The operation of the system will now be described. Referring to FIG. 3, and assuming that the position of the shaft 28 as shown therein represents a fully open position of the valve 22, it will be seen that the extent of the magnetically conductive material 44 imbedded in the end of the stub shaft 28 very nearly bridges the gap between the two pole pieces 46. As a result, the highest degree of magnetic coupling between the primary winding 48 and the secondary winding 50 obtainable will be present and the maximum amount of current will be induced in the winding 50. As the stub shaft 28 is rotated by the rotation of the valve member 22, which in turn is rotated by the shaft 18 and the operator 20, the degree of magnetic coupling will be continually decreased thereby continually reducing the amount of current induced in the secondary winding 50. When the magnetically conducting material 44 imbedded in the end of the stub shaft 28 is in a position 90° from that shown in FIG. 3, the valve member 22 will be in a fully closed position and there will be minimum magnetic coupling and therefore a minimum amount of current induced in the winding 50.

The amount of current induced in the winding 50 will, of course, drive the meter 54 and the same may be graduated directly in terms of the degree of openness or closedness of the valve member 22.

One particular area of use of a valve embodying the invention wherein the magnetic flux path is configured in the manner set forth in the foregoing example is in fire protecting systems wherein the valve is employed in a sprinkler line. In such systems it is necessary that the valves be maintained open except during periodic inspections. Specifically, with the foregoing configuration there will be maximum magnetic coupling when the valve is fully open and therefore a maximum indication on a monitoring meter.

Accordingly, a person monitoring or inspecting the system will be fully apprised at a glance as to whether the system is functioning properly and the valve is open. On the other hand, if the valve is closed, or if there is an electrical malfunction in the system, a minimum of zero meter reading will be given due to minimum magnetic coupling or lack of power for example, respectively, and again the reader will be immediately apprised.

The foregoing is in contrast to the above-mentioned valve-monitoring system wherein windings are embodied in both the valve member and the valve casing. In such a system, magnetic coupling is at its minimum when the valve is fully open and accordingly, a fully open reading would be very similar to that which would be obtained if there were an electrical malfunction in the system thereby requiring much closer scrutiny by the operator when monitoring or inspecting such a system.

Of course, if a maximum meter reading is desired when the valve is in a fully closed condition, the same can be obtained in a system made according to the invention simply by altering the position of the magnetically conducting material 44 on the stub shaft 28 by 90° from the configuration mentioned in the preceding example of operation.

The foregoing construction possesses a number of advantages over those systems heretofore known. For example, all parts requiring connection to electrical conductors are stationary thereby obviating any need for costly machining to accommodate an electrical takeoff system. Furthermore, the system is self-contained and may be located on the exterior of a valve so as to be isolated from the liquid whose flow is regulated thereby to minimize any chance of shorting. In this respect, it is only necessary to provide seals sufficient to withstand the pressure of ground water as opposed to pipeline pressure, a factor which significantly simplifies construction. Additionally, because the system is associated with an undriven shaft rotatable with the valve member, the chances of the same shearing are extremely small as compared to the possibility of the valve drive shaft shearing. Accordingly, even if the valve drive shaft were to shear, an accurate and reliable indication of valve position is obtained by monitoring the position of the undriven stub shaft. Furthermore, a standard system can be used with valves of varying sizes. That is, a single standardized sensor unit may be employed with a variety of valves for while the size of the stub shaft will vary dependent on the size of a given valve, the ends of the stub shafts may be turned down to a common diameter as represented by the reduced diameter end 42 without weakening the assembly. Additionally, because the sensor unit may be standardized, the indicating system as exemplified by the meter 54, may also be standardized, a desirable feature unobtainable in those constructions where coils are embodied in the valve member and the valve casing. Finally, because of the electromagnetic compactness of the sensor, significantly lower voltages that are electrically easier to handle may be employed than would be the case in those systems wherein the coils are placed in the valve member and the valve casing.

I claim

1. A valve position indicating system comprising:

a valve casing;

a valve member rotatable within said casing between open and closed positions;

means mounting said valve member for rotation within said casing and including a first shaft secured to said valve member and having valve operating means associated therewith, and a second shaft secured to said valve member and movable therewith;

electromagnetic means including a first element secured to said second shaft to be movable with the same and said valve member, and a second element stationarily secured to said casing, said electromagnetic means providing a signal whose magnitude is dependent upon the relative positions of said first and second elements; and indicating means responsive to said signal.

2. A valve position indicating system according to claim 1 wherein said electromagnetic means are located externally of said valve casing.

3. A valve position indicating system according to claim 1 wherein said first element comprises a piece of magnetically conducting material imbedded in an end of said second shaft; and said second element comprises a housing formed of a magnetically conducting material surrounding said second shaft end, magnetic pole means extending inwardly from said housing toward said second shaft end; and a pair of electrical windings, one on each of said inwardly extending magnetic pole means.

4. A valve position indicating system according to claim 3 wherein each of said inwardly extending magnetic pole means comprises a generally T-shaped member, said housing includes opposed apertures in a side thereof each receiving the base of a corresponding T-shaped member, and said windings are wrapped about a corresponding one of said T-shaped members.

5. A valve position indicator for use with a valve having a nonmagnetically conducting shaft with a magnetically conducting material imbedded therein and movable with a valve member comprising a generally closed housing formed at least in part of a magnetically conducting material and having at least one opening therein for receiving said valve shaft;

means on said housing for securing said housing to a valve casing;

a pair of magnetic pole elements within said housing in magnetically conducting relation with the magnetically conducting portion of said housing and adapted to form a magnetic flux path with said housing and the magnetically conducting material imbedded in the shaft;

a primary winding operatively associated with one of said pole elements and adapted to be connected to a pulsating source of electrical power; and a secondary winding operatively associated with the other of said pole elements and adapted to provide a signal whose magnitude is dependent upon the relative position of the magnetic material imbedded in the shaft within said magnetic flux path.

6. A valve position indicator according to claim 5 wherein each of said pole elements comprises a generally T-shaped member having its base removably secured to said housing and having the associated one of said primary and secondary windings wound about its midsection with the top thereof generally parallel to the axis of said shaft receiving opening.

7. A valve position indicating system comprising a valve casing;

a valve member rotatable within said casing between open and closed positions;

means mounting said valve member for rotation within said casing and including a shaft secured to said valve member to be movable therewith and having an end extending from said casing;

electromagnetic means including a first element secured to said shaft end externally of said casing to be movable with said shaft and said valve member, and a second element stationarily secured to said casing at the exterior thereof, said electromagnetic means providing a signal whose magnitude is dependent upon the relative positions of said first and second elements; and indicating means responsive to said signal.

8. A valve position indicator system according to claim 7 wherein said first element is formed of a magnetically conducting material; and said second element comprises magnetic conducting means arranged to define a magnetic flux path including said first element, and a pair of electrical windings magnetically associated with said flux path.

9. A valve position indicator system according to claim 8 wherein said mounting means further comprises an additional shaft secured to said valve member; and drive means for said additional shaft for moving the valve member within said casing.

10. A valve position indicator system according to claim 9 wherein said magnetic conducting means includes a housing formed of magnetic conducting material and containing said shaft end and said windings, said housing being secured to the exterior of said valve casing.

11. A valve position indicator system according to claim 8 wherein said magnetic conducting means are mounted for selective adjustable positioning with respect to said first element.

12. A valve position indicating system according to claim 7 wherein said first and second elements are arranged with respect to each other and with respect to said valve member so that maximum magnetic coupling will be obtained when said valve member is in said open position.